March 24, 1942.  W. E. BULLOCK  2,277,631
ASSEMBLY JIG FOR PLATE WELDING AND OTHER OPERATIONS
Filed Jan. 27, 1941  3 Sheets-Sheet 1

Inventor
William E. Bullock
by Babcock & Babcock
Attorneys

March 24, 1942. W. E. BULLOCK 2,277,631
ASSEMBLY JIG FOR PLATE WELDING AND OTHER OPERATIONS
Filed Jan. 27, 1941 3 Sheets-Sheet 3

Inventor
William E. Bullock
by Babcock & Babcock
Attorneys

Patented Mar. 24, 1942

2,277,631

UNITED STATES PATENT OFFICE 2,277,631

ASSEMBLY JIG FOR PLATE WELDING AND OTHER OPERATIONS

William Edmund Bullock, near Compton, Wolverhampton, England, assignor to Guy Motors Limited, Wolverhampton, England Application January 27, 1941, Serial No. 376,236
In Great Britain June 2, 1939

1 Claim. (Cl. 29—89)

This invention relates to a jig for use in assembling the component parts of a composite metal structure.

The object of the invention is to facilitate assembly of the component parts of the structure in their correct relative positions, and their connection with each other by welding and other operations.

A further object of the invention is to enable the jig to be manipulated so that the various joints of the structure carried thereby can be presented in the best and most accessible positions for welding purposes.

According to the invention a jig for use in assembling the component parts of composite metal structures comprises a framework of cylindrical form adapted to receive and to secure said component parts in their correct relative positions for connection with one another, said framework being mounted so as to be capable of rotation and of being tilted at either end.

The accompanying drawings illustrate by way of example the application of the invention to a jig adapted for use in the assembly of the bodies of vehicles.

Figure 1:
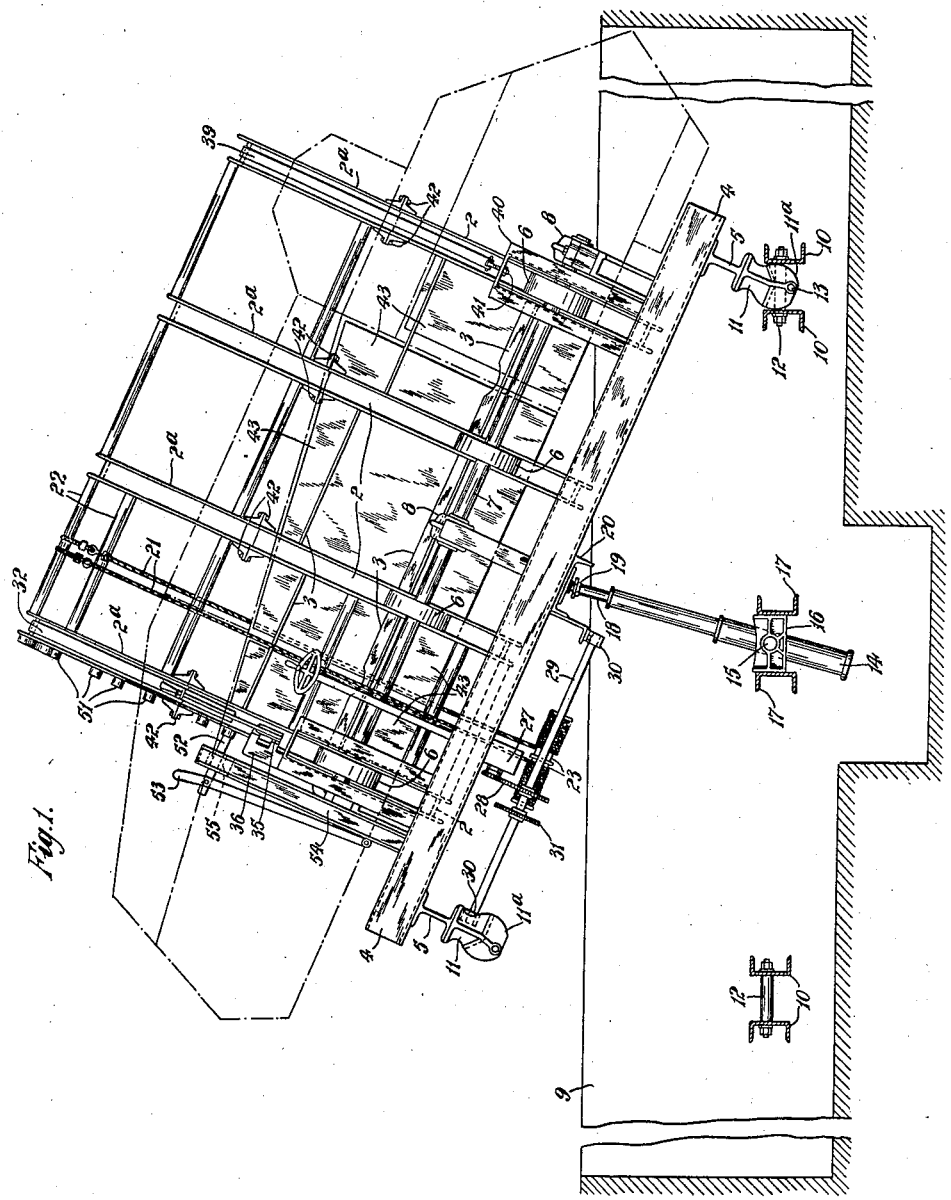
Figure 1 is a side view of the improved jig shown in a tilted position.

Referring to the construction shown in the drawings, the jig itself consists of a skeleton framework comprising a series of metal rings 2 of channel section arranged co-axially in parallel planes at suitable distances apart and rigidly connected together by means of longitudinally arranged webs 3. This cylindrical framework is carried by a substructure consisting of a flat frame comprising longitudinal and transverse girder members 4, 5. The jig is rotatably mounted on the substructure by means of rollers 6 which engage the rings 2 and are carried by shafts 7 mounted in bearings 8 carried by the longitudinal members 4 of the said substructure.

In order to provide the maximum amount of head room the jig is mounted over a pit 9 in which the substructure is supported at each end in a normally horizontal position by means of transverse girders 10 the ends of which are let into the walls of the pit.

To enable the jig to be manipulated so that the various joints of the composite structure carried thereby can be presented in the best and most accessible positions for welding purposes, the jig, besides being rotatable, is also capable of being tilted at either end. For this purpose the substructure is provided at each end with brackets 11 having forked free ends 11ª adapted to bear upon and to have a releasable engagement with pins 12 carried by the girders 10. Normally, the brackets are retained in engagement with their respective pins 12 by means of withdrawable bolts 13 passed through the forked ends of the brackets and engaging below the said pins.

After withdrawing the bolts 13 from the brackets at one end of the substructure, the latter, together with the rotatable jig, can be tilted in a vertical plane on the pins 12 supporting the brackets at the other end of the substructure.

Any suitable means may be employed for tilting the substructure and jig. In the arrangement shown, a pair of hydraulic cylinders 14 is employed, each of which is mounted on horizontal trunnions 15 supported in bearings 16 carried by a girder 17 extending across the pit. The outer end of the plunger 18 of each cylinder has a ball and socket connection 19 with a central transverse member 20 of the substructure. The operation of the hydraulic plungers can be controlled in any well known and appropriate manner. Pneumatic or mechanical means may, if desired, be substituted for the hydraulic gear above described.

The rotation of the jig may likewise be effected in any suitable manner. In the arrangement illustrated two cables 21 are passed around the jig in opposite directions one end of each cable being anchored to one of a series of bars 22 extending between a pair of the rings 2, the other ends being wound upon and attached to drums 23 fixed to a shaft 24 which is supported in bearings 25 carried by the transverse members 5 and 20 of the substructure. This shaft is rotated by means of a hand wheel 26 and worm gear 27, the motion being transmitted by an endless chain 28 to an intermediate shaft 29, supported in bearings 30 also carried by the substructure, and thence by a second endless chain 31 to the shaft 24 carrying the drums 23. The direction of rotation of the drums will depend upon the direction of rotation of the hand wheel, one cable being wound on and the other unwound from its drum.

Figure 4:
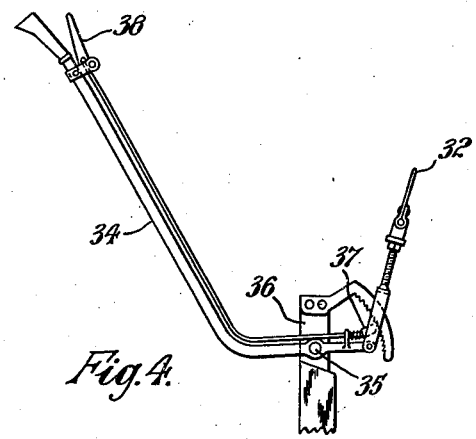
Figure 4 is a detail view of brake mechanism.

Provision is made for locking the jig in any desired angular position. For example, a brake band 32 can be passed around one of the rings 2. One end of the band is anchored to a bracket 33 on the substructure and the other end connected to one arm of a brake lever 34 pivoted at 35 in a bracket 36 also fixed to the substructure, as shown in Figure 4. The brake lever is held in its adjusted position by means of a pawl 37 having a trigger release 38.

The rotatable jig may be retained in engagement with the rollers 6 by means of a friction band 39 passing around another of the rings 2 and secured at each end to brackets 40 on the substructure. The frictional effect of this band can be varied by means of an adjusting nut 41 at one end of the band.

In order to facilitate the introduction of the components into position in the jig and to enable the completed structure to be removed therefrom, the upper portions 2ª of the rings 2 are made detachable and are secured to the main portions by bolts 42. Alternatively, the said upper portions may be hinged at one end to the main portions.

Figure 2:
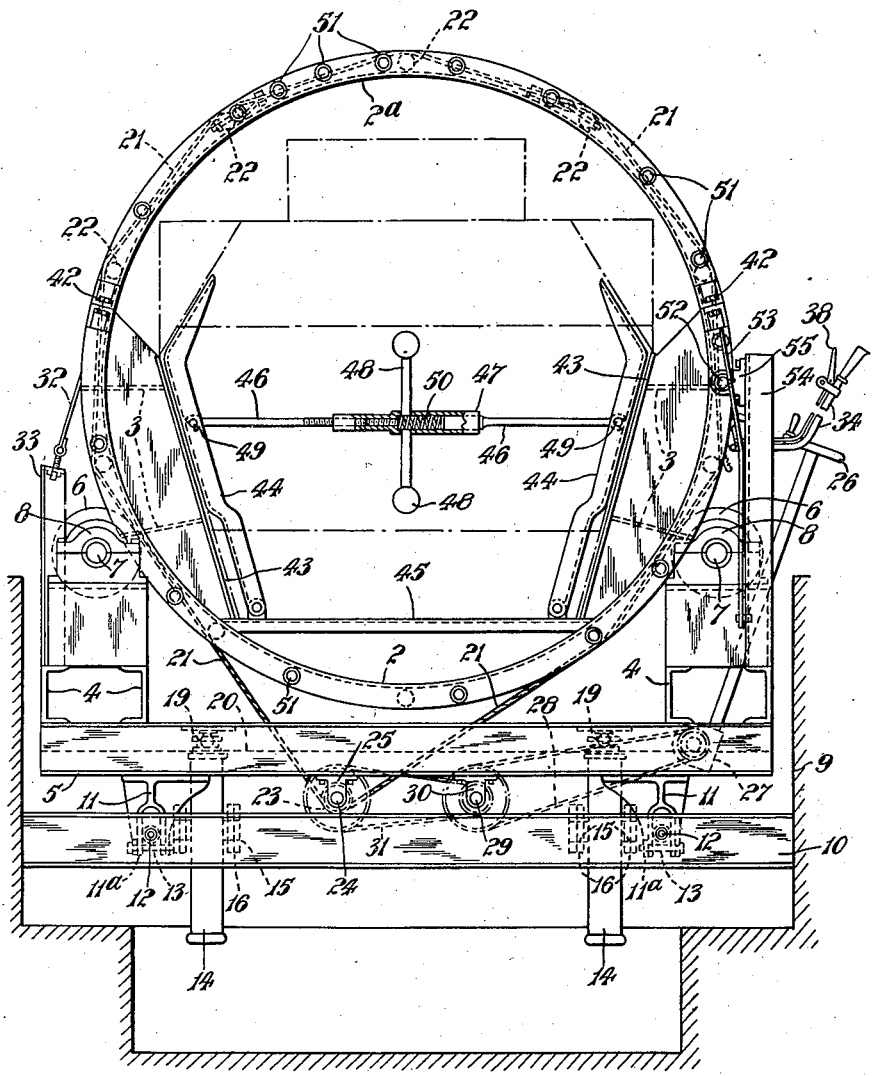
Figure 2 is an end elevation thereof in its horizontal position.
Figure 3:
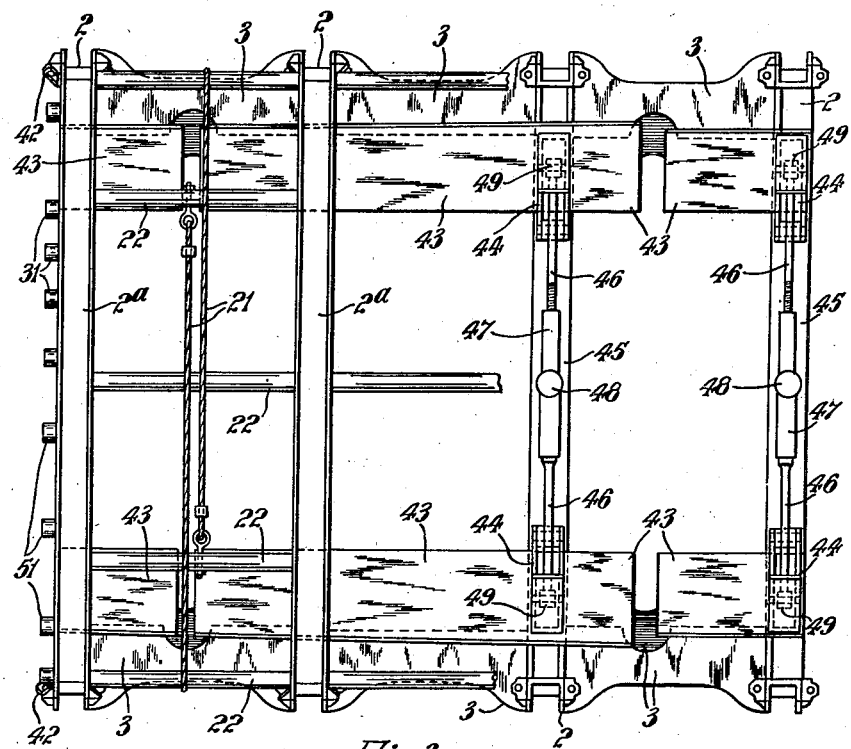
Figure 3 is a plan view of the jig removed from its substructure.

For the purpose of securing the component parts of the structure in their correct relative positions for the welding operation suitable clamping devices are provided within the rotatable jig. In the construction shown the component parts of the structure, indicated in dotted lines in Figures 1 and 2, are adapted to be firmly clamped against plates 43 secured to the rings 2, by means of levers 44. These levers are pivoted at their lower ends to transverse rails 45 fixed within the jig. The clamping pressure is transmitted to the levers by means of rods 46 one of which carries a sleeve 47 having a screw-threaded engagement with the other rod. The sleeve is provided with handles 48 for rotating it to move the levers towards and away from the plates. To facilitate removal of the structure after the welding operation the outer ends of the rods, as shown, have a forked engagement with pins 49 on the levers so that they can be readily disengaged therefrom and the levers swung clear of the structure. A compression spring 50 is preferably introduced between the inner ends of the rods so as to provide for the exertion of a resilient pressure on the components. The said clamping devices may, however, be operated by hydraulic, pneumatic or other means in any suitable manner but in all cases it is desirable to provide a degree of resilience to allow for what is technically known as "breathing" of the components during the welding operation.

For the purpose of enabling the rotatable jig to be positively located in any desired angular position, one of the end rings 2 may, as shown, be provided around its outer face with a series of recessed projections 51 with which a locating bolt 52 is adapted to co-operate. This bolt is carried by a lever 53 pivoted in a bracket 54 on the substructure and is guided in a bearing 55 carried by the upper end of said bracket.

In operation, the two side structures of a vehicle body are inserted in the jig in which they are located longitudinally in their correct relative positions by locating stops (not shown). The clamping means above described are then operated to hold the said side structure in position whilst the end plates and other component parts of the body are being welded to the side structures. The said end plates and other component parts are first secured to the side structures by tack welding or by other local securing means which will retain said parts in position during the main welding operation. The jig can then be rotated and/or tilted at either end so as to enable the joints which are to be welded, to be arranged horizontally and in the best position for the welding operation. After the welding has been completed, the clamps can be disengaged from the structure and the detachable or pivoted sections of the rings moved clear of the path of the structure which can then be removed from the jig.

The improved jig can be employed in the assembly of the component parts of a wide variety of composite metal structures and owing to the ease with which it can be universally manipulated it is especially advantageous when employed for assembling the composite side members of the bodies of vehicles and for welding the same to the front and rear members and to any intermediate transverse members of the said body.

I claim:

A jig for use in assembling the component parts of composite metal structures comprising a substructure arranged for tilting at either end, a hollow framework rotatably mounted on said substructure and consisting of a series of co-axially arranged metal rings spaced apart in parallel planes and connected together by longitudinal members, said framework being adapted to receive the component parts, and means arranged within said framework for holding said component parts in the relative positions in which they are to be secured together.

WILLIAM EDMUND BULLOCK.